United States Patent
Xu et al.

(10) Patent No.: US 9,208,675 B2
(45) Date of Patent: Dec. 8, 2015

(54) LOITERING DETECTION IN A VIDEO SURVEILLANCE SYSTEM

(71) Applicant: Behavioral Recognition Systems, Inc., Houston, TX (US)

(72) Inventors: Gang Xu, Katy, TX (US); Wesley Kenneth Cobb, The Woodlands, TX (US)

(73) Assignee: BEHAVIORAL RECOGNITION SYSTEMS, INC., Houston, TX (US)

( * ) Notice: Subject to any disclaimer, the term of this patent is extended or adjusted under 35 U.S.C. 154(b) by 0 days.

(21) Appl. No.: 13/836,372

(22) Filed: Mar. 15, 2013

(65) Prior Publication Data
US 2013/0243252 A1    Sep. 19, 2013

Related U.S. Application Data

(60) Provisional application No. 61/611,284, filed on Mar. 15, 2012.

(51) Int. Cl.
| G06K 9/00 | (2006.01) |
| G06T 7/20 | (2006.01) |
| G08B 13/196 | (2006.01) |
| G08B 23/00 | (2006.01) |
| H04N 7/00 | (2011.01) |
| G06K 9/32 | (2006.01) |

(52) U.S. Cl.
CPC ............ *G08B 23/00* (2013.01); *G06K 9/00369* (2013.01); *G06K 9/00771* (2013.01); *G06K 9/3241* (2013.01); *H04N 7/002* (2013.01); *G08B 13/19608* (2013.01)

(58) Field of Classification Search
None
See application file for complete search history.

(56) References Cited

U.S. PATENT DOCUMENTS

| 4,679,077 A | 7/1987 | Yuasa et al. |
| 5,113,507 A | 5/1992 | Jaeckel |
| 5,748,775 A | 5/1998 | Tsuchikawa et al. |
| 5,751,378 A | 5/1998 | Chen et al. |
| 5,969,755 A | 10/1999 | Courtney |
| 6,252,974 B1 | 6/2001 | Martens et al. |
| 6,263,088 B1 | 7/2001 | Crabtree et al. |
| 6,570,608 B1 | 5/2003 | Tserng |

(Continued)

FOREIGN PATENT DOCUMENTS

WO    2009049314 A2    4/2009

OTHER PUBLICATIONS

A. Wiliem, V. Madasu, W. Boles and P. Yarlagadda "Detecting uncommon trajectories", Proc. Digital Image Computing: Tech. and Applications, 2008, pp. 398-404.*

(Continued)

*Primary Examiner* — Matthew Bella
*Assistant Examiner* — Soo Shin
(74) *Attorney, Agent, or Firm* — Patterson + Sheridan, LLP

(57) ABSTRACT

A behavioral recognition system may include both a computer vision engine and a machine learning engine configured to observe and learn patterns of behavior in video data. Certain embodiments may be configured to learn patterns of behavior consistent with a person loitering and generate alerts for same. Upon receiving information of a foreground object remaining in a scene over a threshold period of time, a loitering detection module evaluates the whether the object trajectory corresponds to a random walk. Upon determining that the trajectory does correspond, the loitering detection module generates a loitering alert.

24 Claims, 7 Drawing Sheets

(56) References Cited

U.S. PATENT DOCUMENTS

| | | | |
|---|---|---|---|
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,133,537 B1* | 11/2006 | Reid | 382/103 |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 8,167,430 B2 | 5/2012 | Cobb et al. | |
| 8,169,481 B2* | 5/2012 | Ozdemir et al. | 348/155 |
| 8,218,818 B2 | 7/2012 | Cobb et al. | |
| 8,280,153 B2 | 10/2012 | Cobb et al. | |
| 8,285,060 B2 | 10/2012 | Cobb et al. | |
| 8,300,924 B2 | 10/2012 | Eaton et al. | |
| 8,340,352 B2 | 12/2012 | Cobb et al. | |
| 8,379,085 B2 | 2/2013 | Cobb et al. | |
| 8,407,625 B2* | 3/2013 | Cohen et al. | 715/863 |
| 8,411,935 B2 | 4/2013 | Eaton et al. | |
| 8,493,409 B2 | 7/2013 | Cobb et al. | |
| 8,719,198 B2* | 5/2014 | Zheng et al. | 706/21 |
| 2003/0107650 A1 | 6/2003 | Colmenarez et al. | |
| 2003/0228058 A1 | 12/2003 | Xie et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2005/0281435 A1* | 12/2005 | Aggarwal | 382/103 |
| 2006/0018516 A1 | 1/2006 | Masoud et al. | |
| 2006/0138338 A1 | 6/2006 | Tezuka et al. | |
| 2006/0165386 A1 | 7/2006 | Garoutte | |
| 2006/0190419 A1 | 8/2006 | Bunn et al. | |
| 2006/0193516 A1 | 8/2006 | Toyama et al. | |
| 2006/0222206 A1 | 10/2006 | Garoutte | |
| 2007/0250898 A1 | 10/2007 | Scanlon et al. | |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0247599 A1 | 10/2008 | Porikli et al. | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2010/0150471 A1 | 6/2010 | Cobb et al. | |
| 2010/0322516 A1 | 12/2010 | Xu et al. | |
| 2011/0134245 A1* | 6/2011 | Khizhnichenko | 348/148 |
| 2012/0140042 A1* | 6/2012 | Albertson et al. | 348/46 |
| 2013/0241730 A1 | 9/2013 | Saitwal et al. | |
| 2013/0242093 A1 | 9/2013 | Cobb et al. | |

OTHER PUBLICATIONS

M. Kardar, Mar. 28, 2008, "Random Walks 1" http://www.mit.edu/~kardar/teaching/projects/chemotaxis(AndreaSchmidt)/random.htm.*

M. Kardar, Mar. 28, 2008, "Random Walks 2" http://www.mit.edu/~kardar/teaching/projects/chemotaxis(AndreaSchmidt)/more_random.htm.*

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Haritaogul et al. "W4: Real-Time Surveillance of People and Their Activities," IEEE Transactions on Pattern Analysis and Machine Intelligence, Aug. 2000; vol. 22, No. 8; pp. 809-830.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Pentti Kanerva "Sparse Distributed memory and Related Models," M.H. Hassoun, ed., Associative Neural Memories: Theory and Implementation, 1993, pp. 50-76. New York: Oxford University Press.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

J. Connell et al., "Detection and Tracking in the IBM PeopleVision System," IEEE ICME, Jun. 2004: pp. 1-4, <http://www.research.ibm.com/peoplevision>.

* cited by examiner

MAP OF COMMON LOITERING REGIONS

LOITERING DETECTION IN A VIDEO SURVEILLANCE SYSTEM

CROSS-REFERENCE TO RELATED APPLICATIONS

This application claims priority to U.S. provisional application having Ser. No. 61/611,284, filed on Mar. 15, 2012.

BACKGROUND

1. Field of the Invention

Embodiments presented herein disclose a loitering detection module for a behavioral recognition-based video surveillance system. More specifically, embodiments relate to techniques for detecting loitering behavior of an observed object within a series of video frames.

2. Description of the Related Art

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked from frame-to-frame in order to follow the "blob" moving through the scene over time, e.g., a person walking across the field of vision of a video surveillance camera. Further, such systems may be configured to determine when an object has engaged in certain predefined behaviors. For example, the system may include definitions used to recognize the occurrence of a number of predefined events, e.g., the system may evaluate the appearance of an object classified as depicting a car (a vehicle-appear event) coming to a stop over a number of frames (a vehicle-stop event). Thereafter, a new foreground object may appear and be classified as a person (a person-appear event) and the person then walks out of frame (a person-disappear event). Further, the system may be able to recognize the combination of the first two events as a "parking-event."

However, such surveillance systems typically require that the objects and/or behaviors which may be recognized by the system be defined in advance. Thus, in practice, these systems rely on predefined definitions for objects and/or behaviors to evaluate a video sequence. Unless the underlying system includes a description for a particular object or behavior, the system is generally incapable of recognizing that behavior (or at least instances of the pattern describing the particular object or behavior). More generally, such systems rely on predefined rules and static patterns and are thus often unable to dynamically identify objects, events, behaviors, or patterns, much less even classify them as either normal or anomalous. Further, such rules-based systems are often unable to identify related anomalies from different patterns of observed behavior, such as loitering behavior of an object within a series of video frames. Loitering detection is a difficult problem for these systems because there are many ways and no set path for an object to loiter. Thus, currently available video surveillance systems have limited usefulness.

SUMMARY

Embodiments of the invention relate to techniques for detecting loitering behavior of objects depicted in a scene captured by a video camera. This method may generally include receiving a trajectory for an object in the scene that has been in the scene for a time period. The trajectory tracks a two-dimensional path of the object relative to a series of video frames in which the object is depicted. This method may also include generating a loitering alert upon determining that the time period the object has been in the scene is greater than a threshold time period and that the trajectory of the object corresponds to a random walk.

Additionally, determining whether the object trajectory corresponds to a random walk may be evaluated as $D<\sqrt{2N}$, where D is a distance from a starting point in the trajectory to a final point in the trajectory and N is a total number of steps in the trajectory. Alternatively, determining whether the object trajectory corresponds to a random walk may comprise calculating an estimated loitering score from a global and local loitering score and comparing the estimated loitering score with a threshold loitering score. If the estimated loitering score is greater than the threshold loitering score, then the trajectory corresponds to a random walk.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features, advantages, and objects of the present invention are attained and can be understood in detail, a more particular description, briefly summarized above, may be had by reference to the embodiments illustrated in the appended drawings.

It is to be noted, however, that the appended drawings illustrate only typical embodiments of this invention and are therefore not to be considered limiting of its scope, for the disclosure may admit to other equally effective embodiments.

DETAILED DESCRIPTION

Figure 1:
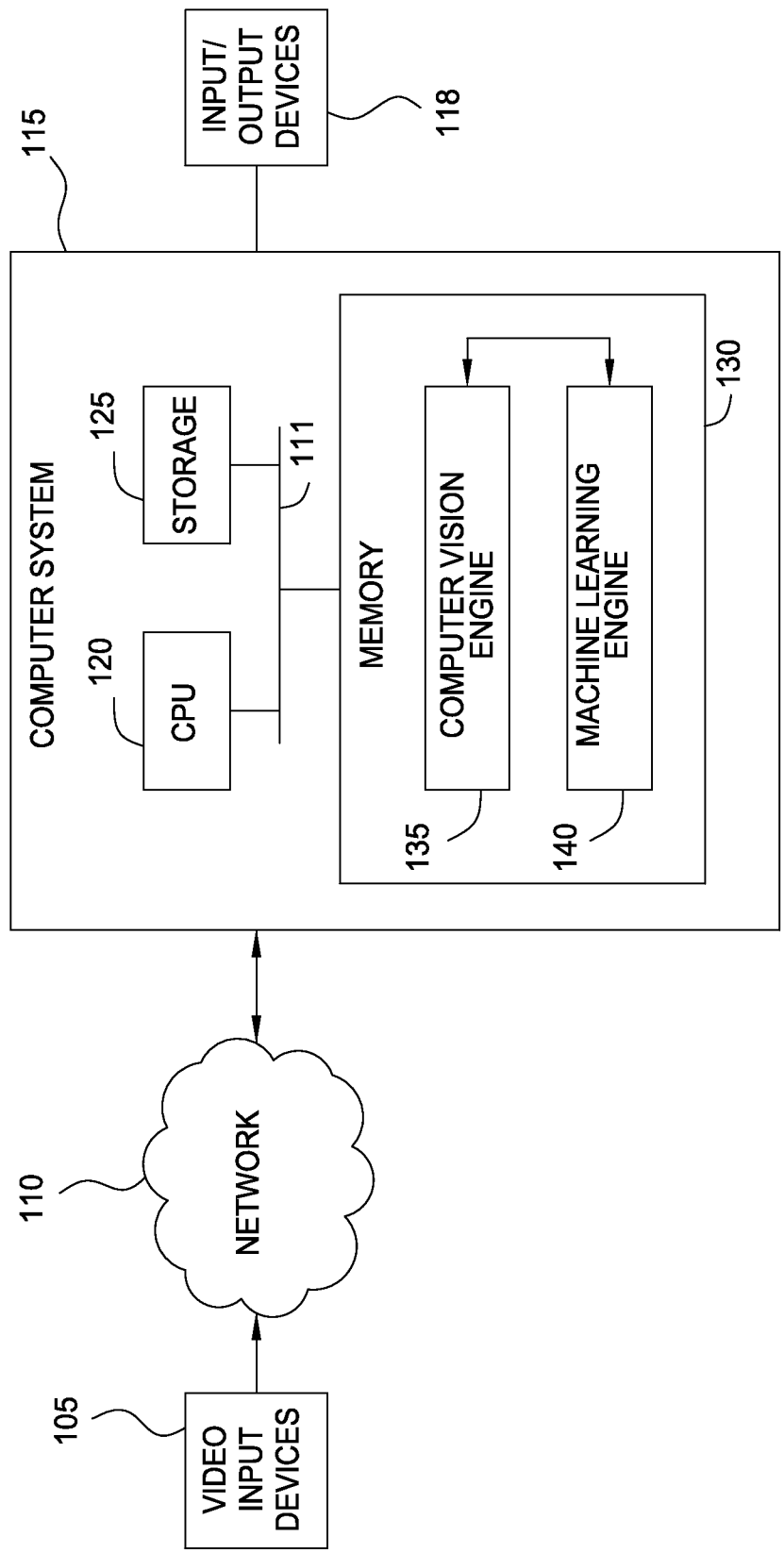
FIG. 1 illustrates components of a video analysis and behavioral recognition system, according to one embodiment.

Embodiments of the present invention provide techniques for analyzing an acquired stream of video frames to learn patterns of behavior consistent with loitering behavior. Once loitering behavior is observed (with some measure of confidence), a behavioral recognition-based video surveillance system may generate alerts indicating that a person (or some other object) is loitering within a scene captured by a video camera. Objects depicted in the stream are determined based on an analysis of the video frames.

A behavioral recognition system may be configured to learn, identify, and recognize patterns of behavior by observing a sequence of individual frames, otherwise known as a video stream. Unlike a rules-based video surveillance system, which contains predefined patterns of what to identify, the behavioral recognition system disclosed herein learns patterns by generalizing input and building memories of what is observed. Over time, the behavioral recognition system uses these memories to distinguish between normal and anomalous behavior within the field of view captured within a video stream. Generally this field of view is referred to as the "scene."

In one embodiment, the behavioral recognition system includes a computer vision engine and a machine learning engine. The computer vision engine may be configured to process a scene, generate information streams of observed activity, and then pass the streams to the machine learning engine. In turn, the machine learning engine may be configured to learn object behaviors in that scene. In addition to learning-based behavior, a machine learning engine may be configured to build models of certain behaviors within a scene and determine whether observations indicate that the behavior of an object is anomalous, relative to the model.

In one embodiment, the machine learning engine may include a loitering detection module. This module may be configured to determine whether an object exhibits loitering behavior within a scene and whether to generate an alert for the behavior. To do this, the machine learning engine evaluates the trajectory of an object that remains in a scene past a threshold period of time. The value for this threshold period may be set as a matter of preference (e.g., three minutes) or set relative to a distribution of how long objects remain in the scene. Such an object remaining in the scene past the threshold time then becomes a candidate for evaluation by the loitering detection module. The loitering detection module determines whether the object's activity corresponds to normal loitering activity or to activity that is not loitering. If the activity is neither, then the loitering detection module returns a loitering alert to the machine learning engine, which may report that alert to a user interface.

In some cases, the loitering detection module should not generate a loitering alert, even if an observed object remains in a scene for a long period of time. Accordingly, the machine learning engine may be configured to recognize normal loitering activity, i.e., loitering activity which should not result in an alert. For example, the machine learning engine may determine that an individual waiting for a bus at a terminal has remained in the scene for an extended period of time, but because it is normal for an individual to wait for a bus for a certain amount of time, the machine learning engine should not generate an alert. In one embodiment, the machine learning engine addresses this by creating a map of regions within a scene where an object may remain in the scene for an extended period. For example, consider the example of a hotel lobby. A video camera focused on a hotel lobby may, on a regular basis, record individuals standing by the lobby elevator waiting for the doors to open or exiting from an elevator. Such a camera may also capture people seated on the lobby furniture for a period of time. In response, the machine learning engine may identify regions in the hotel lobby where individuals loiter. Further, the machine learning engine may learn how long they loiter, and so when individuals remain in those areas within a certain period of time, the machine learning engine does not generate a loitering alert for this behavior. Tolerances for how close an object should be within the area for the machine learning engine to recognize normal loitering activity may be set as a matter of preference.

In one embodiment, the loitering detection module may evaluate whether the individual is engaged in loitering behavior by comparing the individual's trajectory to random walk trajectory. As is known, a random walk generally refers to a trajectory consisting of successive steps in a random direction. Generally, if an individual moves N steps, then after the Nth step this individual will have traveled, on average, $\sqrt{2N}$ steps away from the starting position. The theoretical base for applying a two-dimensional random walk model to loitering behavior lies in an established mathematical theorem that states that in a two-dimensional space, a randomly walking subject returns to its original point infinitely often. For example, a scene may identify an individual leaving a subway train and remaining within the camera's field of view for a period of time. In such a case, the video could depict the individual not making a directed set of movements to leave or board a train. In this example, the loitering detection module may determine that the individual is engaged in a random walk based on his trajectory, or more specifically, whether the steps the individual has taken over the final distance from the original point. Alternatively, the loitering detection module may also use a sliding window approach, e.g., the steps the individual has taken over the final distance from a point in the trajectory.

The loitering detection module may determine whether an object is engaged in a random walk by building a discrete random walk model for each observed object, based on object positions and movement sizes, and then evaluating the object's trajectory against the model. In one embodiment, this evaluation can be binary, where the trajectory is determined to be an example of a random walk. In another embodiment, it can also be determined as a measure of how strongly the trajectory matches a random walk pattern, i.e., the more closely a trajectory resembles a random walk pattern, the more likely the trajectory corresponds to a random walk.

In one embodiment, the loitering detection module evaluates an observed object trajectory using both a global perspective and a local perspective before determining whether an object is loitering. The global perspective evaluates the complete trajectory of the object from the point it first appeared in the scene. In contrast, the local perspective evaluates the last N steps of the object's trajectory. This approach ensures that the loitering detection module does not generate a loitering alert in cases where the initial trajectory of an observed object strongly correlates to a random walk, but the most recent observations do not. Likewise, in one embodiment, the loitering detection module does not generate a loitering alert for an individual unless the individual is in a loitering state under both global and local perspectives. Returning to the subway platform example, an individual could leave a train but instead of leaving waits for a period of time to meet another person arriving on a different train. In such a case, the individual's trajectory may exhibit a random walk in the global perspective, but may not in the local perspective.

In the following, reference is made to embodiments of the invention. However, it should be understood that the invention is not limited to any specifically described embodiment. Instead, any combination of the following features and elements, whether related to different embodiments or not, is contemplated to implement and practice what is disclosed. Furthermore, in various embodiments the present invention provides numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, any reference to "the invention" or "the disclosure" shall not be construed as a generalization of any inventive subject matter disclosed herein and shall not be considered to be an element or limitation of the appended claims except where explicitly recited in a claim(s).

One embodiment of the present invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples media include communications media through which information is conveyed to a computer, such as through a computer or telephone network, including wireless communications networks.

In general, the routines executed to implement the embodiments of the present invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the invention should not be limited to use solely in any specific application identified and/or implied by such nomenclature.

In the following, reference is made to people or individuals loitering in a scene. Such reference merely illustrates an example of a foreground object capable of being detected by the behavioral recognition system. Of course, one skilled in the art can recognize that the approaches for determining whether an object is loitering is not limited to people but may apply to other types of objects. For instance, these techniques may also be used to evaluate whether an automobile in a parking lot is in a loitering state. Further, in the following, reference is made to calculating random walk distances using an expected distance approach (i.e., a person is likely to be engaged in a random walk if the total distance traveled is less than the distanced traveled in $\sqrt{2N}$ steps, where N is the total number of steps taken). Such reference is provided for simplicity, and in practice, the loitering score approach, also disclosed in the following, may better scrutinize loitering behavior that warrants attention.

FIG. 1 illustrates components of a video analysis and behavioral recognition system 100, according to one embodiment of the present invention. As shown, the behavioral recognition system 100 includes a video input source 105, a network 110, a computer system 115, and input and output devices 118 (e.g., a monitor, a keyboard, a mouse, a printer, and the like). The network 110 may transmit video data recorded by the video input 105 to the computer system 115. Illustratively, the computer system 115 includes a CPU 120, storage 125 (e.g., a disk drive, optical disk drive, and the like), and a memory 130 containing both a computer vision engine 135 and a machine learning engine 140. As described in greater detail below, the computer vision engine 135 and the machine learning engine 140 may provide software applications configured to analyze a sequence of video frames provided by the video input 105.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area within the camera's field of view is referred to as the scene. The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

As noted above, the computer vision engine 135 may be configured to analyze this raw information to identify active objects in the video stream, identify a variety of appearance and kinematic features used by a machine learning engine 140 to derive object classifications, derive a variety of metadata regarding the actions and interactions of such objects, and supply this information to the machine learning engine 140. And in turn, the machine learning engine 140 may be configured to evaluate, observe, learn and remember details regarding events (and types of events) that transpire within the scene over time.

In one embodiment, the machine learning engine 140 receives the video frames and the data generated by the computer vision engine 135. The machine learning engine 140 may be configured to analyze the received data, cluster objects having similar visual and/or kinematic features, build semantic representations of events depicted in the video frames. Over time, the machine learning engine 140 learns expected patterns of behavior for objects that map to a given cluster. Thus, over time, the machine learning engine learns from these observed patterns to identify normal and/or abnormal events. That is, rather than having patterns, objects, object types, or activities defined in advance, the machine learning engine 140 builds its own model of what different object types have been observed (e.g., based on clusters of kinematic and/or appearance features) as well as a model of expected behavior for a given object type. Thereafter, the machine learning engine can decide whether the behavior of an observed event is anomalous or not based on prior learning.

Data describing whether a normal/abnormal behavior/event has been determined and/or what such behavior/event is may be provided to output devices 118 to issue alerts, for example, an alert message presented on a GUI interface screen.

In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 may analyze each frame in real-time to derive a set of kinematic and appearance data related to objects observed in the frame, the machine learning engine 140 is not constrained by the real-time frame rate of the video input.

Note, however, FIG. 1 illustrates merely one possible arrangement of the behavior recognition system 100. For example, although the video input source 105 is shown connected to the computer system 115 via the network 110, the network 110 is not always present or needed (e.g., the video input source 105 may be directly connected to the computer system 115). Further, various components and modules of the behavior recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
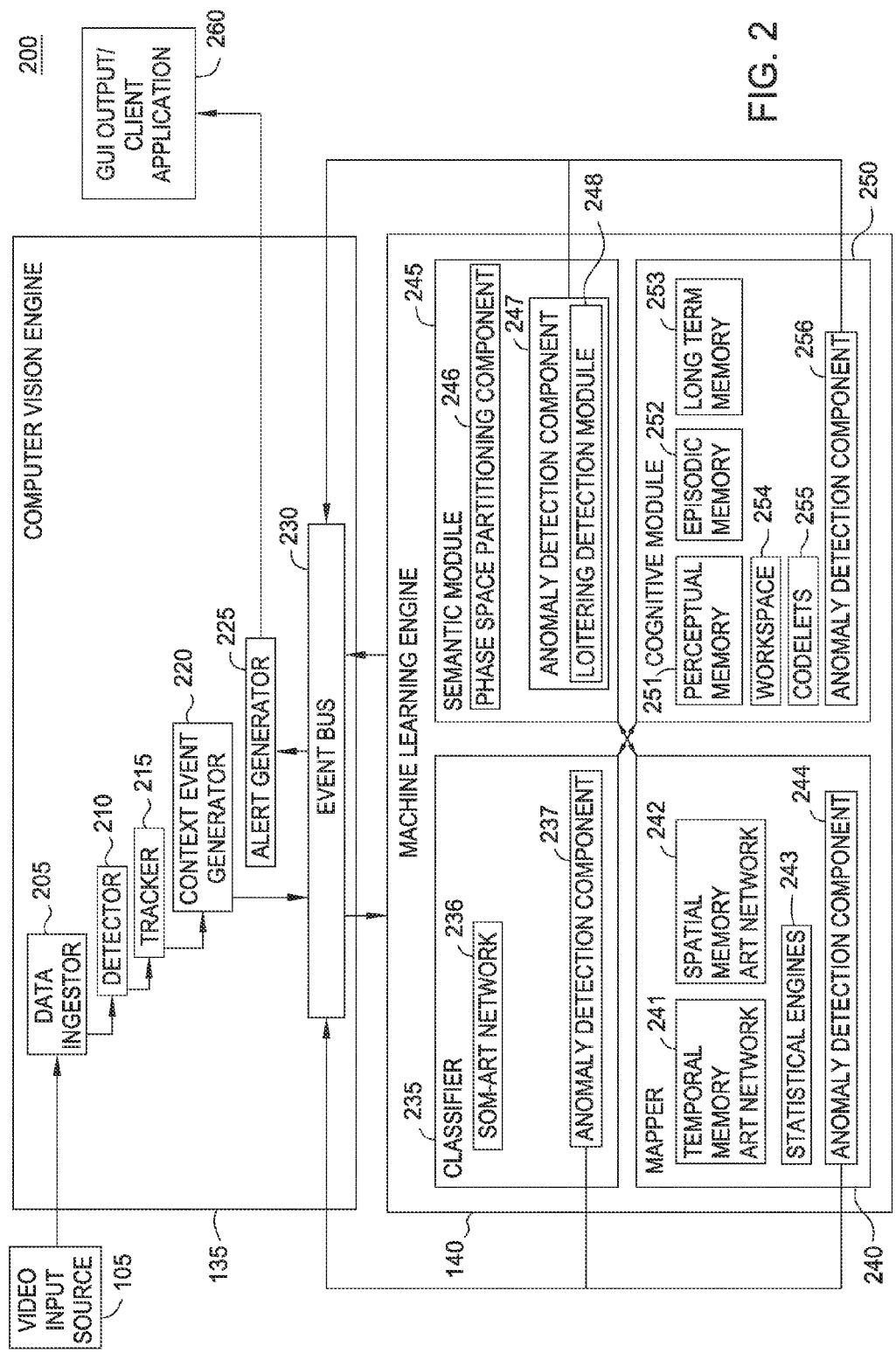
FIG. 2 further illustrates components of the video analysis system shown in FIG. 1, according to one embodiment.

FIG. 2 further illustrates components of the computer vision engine 135 and the machine learning engine 140 first illustrated in FIG. 1, according to one embodiment of the invention. As shown, the computer vision engine 135 includes a data ingestor 205, a detector 210, a tracker 215, a context event generator 220, an alert generator 225, and an event bus 230. Collectively, the components 205, 210, 215, and 220 provide a pipeline for processing an incoming sequence of video frames supplied by the video input source 105 (indicated by the solid arrows linking the components). In one embodiment, the components 210, 215, and 220 may each provide a software module configured to provide the functions described herein. Of course, one of ordinary skill in the art will recognize that the components 205, 210, 215, and 220 may be combined (or further subdivided) to suit the needs of a particular case and further that additional components may be added (or some may be removed) from a video surveillance system.

In one embodiment, the data ingestor 205 receives raw video input from the video input source 105. The data ingestor 205 may be configured to preprocess the input data before sending it to the detector 210. For example, the data ingestor 205 may be configured to separate each frame of video provided into a stationary or static part (the scene background) and a collection of volatile parts (the scene foreground). The frame itself may include a two-dimensional array of pixel values for multiple channels (e.g., RGB channels for color video or grayscale channel or radiance channel for black and white video). In one embodiment, the detector 210 may model background states for each pixel using an adaptive resonance theory (ART) network. That is, each pixel may be classified as depicting scene foreground or scene background using an ART network modeling that pixel. Of course, other approaches to distinguish between scene foreground and background may be used.

Additionally, the detector 210 may be configured to generate a mask used to identify which pixels of the scene are classified as depicting foreground and, conversely, which pixels are classified as depicting scene background. The detector 210 then identifies regions of the scene that contain a portion of scene foreground (referred to as a foreground "blob" or "patch") and supplies this information to subsequent stages of the pipeline. Additionally, pixels classified as depicting scene background may be used to generate a background image modeling the scene.

In one embodiment, the detector 210 may be configured to detect the flow of a scene. For example, once the foreground patches have been separated, the detector 210 examines, from frame-to-frame, any edges and corners of all foreground patches. The detector 210 identifies foreground patches moving in a similar flow of motion as most likely belonging to a single object or a single association of motions. As the detector 210 identifies foreground objects, it sends this information to the tracker 215.

The tracker 215 may receive the foreground patches produced by the detector 210 and generate computational models for the patches. For example, the tracker 215 may be configured to use this information, and each successive frame of raw-video, to attempt to track the motion of, for example, a person depicted by a given foreground patch as it moves about the scene. That is, the tracker 215 provides continuity to other elements of the computer vision engine 135 by tracking the person from frame-to-frame. The tracker 215 may also calculate a variety of kinematic and/or appearance features of a foreground object, e.g., size, height, width, and area (in pixels), reflectivity, shininess rigidity, speed velocity, etc.

The context event generator 220 may receive the output from other stages of the pipeline. Using this information, the context processor 220 may be configured to generate a stream of context events regarding objects tracked (by tracker component 210). For example, the context event generator 220 may package a stream of micro feature vectors and kinematic observations of an object and output this to the machine learning engine 140, e.g., a rate of 5 Hz. In one embodiment, the context events are packaged as a trajectory. As used herein, a trajectory generally refers to a vector packaging the kinematic data of a particular foreground object in successive frames or samples. Each element in the trajectory represents the kinematic data captured for that object at a particular point in time. Typically, a complete trajectory includes the kinematic data obtained when, for example, a person is first observed in a frame of video along with each successive observation up to when the person leaves the scene (or becomes stationary to the point of dissolving into the frame background). Accordingly, assuming computer vision engine 135 is operating at a rate of 5 Hz, a trajectory for an object is updated every 200 milliseconds, until complete. The context event generator 220 may also calculate and package the appearance data of every person by evaluating various appearance attributes such as shape, width, and other physical features and assigning each attribute a numerical score.

The computer vision engine 135 may take the output from the components 205, 210, 215, and 220 describing the motions and actions of each tracked person in the scene and supply this information to the machine learning engine 140 through the event bus 230. Illustratively, the machine learning engine 140 includes a classifier 235, a mapper 240, a semantic module 245, and a cognitive module 250.

The classifier 235 receives context events such as kinematic data and appearance data from the computer vision engine 135 and maps the data on a neural network. In one embodiment, the neural network is a combination of a self-organizing map (SOM) and an ART network, shown in FIG. 2 as component 236. The data is clustered and combined by features occurring repeatedly in association with each other. Then, the classifier 235 defines types of objects based on these recurring features. For example, although the machine learning engine does not recognize a person, per se, the classifier 235 may nonetheless build a classification model corresponding to people based on common microfeatures shared by people in the SOM-ART network 236. These defined types then propagate throughout the rest of the system, e.g., the loitering detection module may evaluate people using the classification model built by classifier 235.

The mapper 240 may search for spatial and temporal correlations and behaviors across the system for foreground patches to create maps of where and when events are likely or unlikely to happen. In one embodiment, the mapper 240 includes a temporal memory ART network 241, a spatial memory ART network 242, and statistical engines 243. For example, the mapper 240 may look for patches corresponding to a person. The spatial memory ART network 242 uses the statistical engines 243 to create statistical data of people, such as of their locations and movements. The mapper 240 then builds a neural network of this information, which becomes a memory template against which to compare behaviors. The temporal memory ART network 241 uses the statistical engines 243 to create statistical data based on samplings of time slices. In one embodiment, initial sampling occurs at every thirty minute interval. If many events occur within a time slice, then the time resolution may be dynamically changed to a finer resolution. Conversely, if fewer events occur within a time slice, then the time resolution may be dynamically changed to a coarser resolution.

In one embodiment, the semantic module 245 includes a phase space partitioning component 246 and an anomaly detection component 247. The anomaly detection component includes a loitering detection module 248. The semantic module 245 identifies patterns of motion or trajectories within a scene and analyzes the scene for anomalous behavior through generalization. After tessellating the scene and dividing the foreground patches into many different tessera, the semantic module 245 traces a person's trajectory and learns patterns from the trajectory. The semantic module 245 analyzes these patterns and compares them with other patterns. Further, as a person enters a scene, the phase space partitioning component 246 maps the person's features and the person's trajectories onto an adaptive grid. As more features and trajectories are populated onto the grid, the machine learning engine learns trajectories that are common to the scene.

The loitering detection module 248 detects loitering behavior by evaluating a person's trajectory and the length of time that the person is in the scene. If a person's trajectory corresponds to a random walk, and if the person is in the scene over a threshold period of time, then the loitering detection module generates a loitering anomaly, which is sent to the alert generator 225. The alert generator 225 may publish a loitering alert to the user.

In one embodiment, the loitering detection module 248 further may be configured to include a learning model. The learning model maintains a count of individuals passing through a scene and time values of how long each individual remains in the scene. By recording the occurrence of an object in a scene and updating model parameters with this information, the learning model effectively stores spatio-temporal statistics for setting time thresholds. In one embodiment, the learning model creates an empirical statistical model (e.g., a histogram) based on this information. The loitering detection module 248 may use this empirical model to set time thresholds for loitering behavior.

In one embodiment, the cognitive module 250 includes a perceptual memory 251, an episode memory 252, a long term memory 253, a workspace 254, and codelets 255. Generally, the workspace 254 provides a computational engine for the machine learning engine 140. For example, the workspace 240 may be configured to copy information from the perceptual memory 251, retrieve relevant memories from the episodic memory 252 and the long-term memory 253, select which codelets 255 to execute. In one embodiment, each codelet 255 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine learning engine. In turn, the codelet 255 may create, retrieve, reinforce, or modify memories in the episodic memory 252 and the long-term memory 253. By repeatedly scheduling codelets 255 for execution, copying memories and percepts to/from the workspace 240, the machine learning engine 140 performs a cognitive cycle used to observe, and learn, about patterns of behavior that occur within the scene.

In one embodiment, the perceptual memory 251, the episodic memory 252, and the long-term memory 253 are used to identify patterns of behavior, evaluate events that transpire in the scene, and encode and store observations. Generally, the perceptual memory 251 receives the output of the computer vision engine 135 (e.g., a stream of context events). The episodic memory 252 stores data representing observed events with details related to a particular episode, e.g., information describing time and space details related on an event. That is, the episodic memory 252 may encode specific details of a particular event, i.e., "what and where" something occurred within a scene, such as a particular vehicle (car A) moved to a location believed to be a parking space (parking space 5) at 9:43 AM.

In contrast, the long-term memory 253 may store data generalizing events observed in the scene. To continue with the example of a vehicle parking, the long-term memory 253 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 253 stores observations about what happens within a scene with much of the particular episodic details stripped away. In this way, when a new event occurs, memories from the episodic memory 252 and the long-term memory 253 may be used to relate and understand a current event, i.e., the new event may be compared with past experience, leading to both reinforcement, decay, and adjustments to the information stored in the long-term memory 253, over time. In a particular embodiment, the long-term memory 253 may be implemented as an ART network and a sparse-distributed memory data structure. Importantly, however, this approach does not require the different object type classifications to be defined in advance.

In one embodiment, each module of the machine learning engine 140 includes an anomaly detection component, as depicted by components 237, 244, 247, and 256. Each anomaly detection component is configured to identify anomalous behavior, relative to past observations of the scene. Generally, if any anomaly detection component identifies anomalous behavior, the component generates an alert. For instance, anomaly detection component 247 in the semantic module 245 detects unusual trajectories using learned patterns and models. If a person exhibits loitering behavior, for example, anomaly detection component 247 evaluates the person's trajectory using loitering models and subsequently generates an alert. If any anomaly detection component reports anomalous behavior, the machine learning engine sends an alert to event bus 230, which sends this alert to the alert generator 225. In one embodiment, the alert generator 225 resides in the computer vision engine 135. The alert generator 225 receives alert information from the anomaly detection components 237, 244, 247, and 256. The alert generator 225 publishes alert information to the GUI/client device 260.

Figure 3:
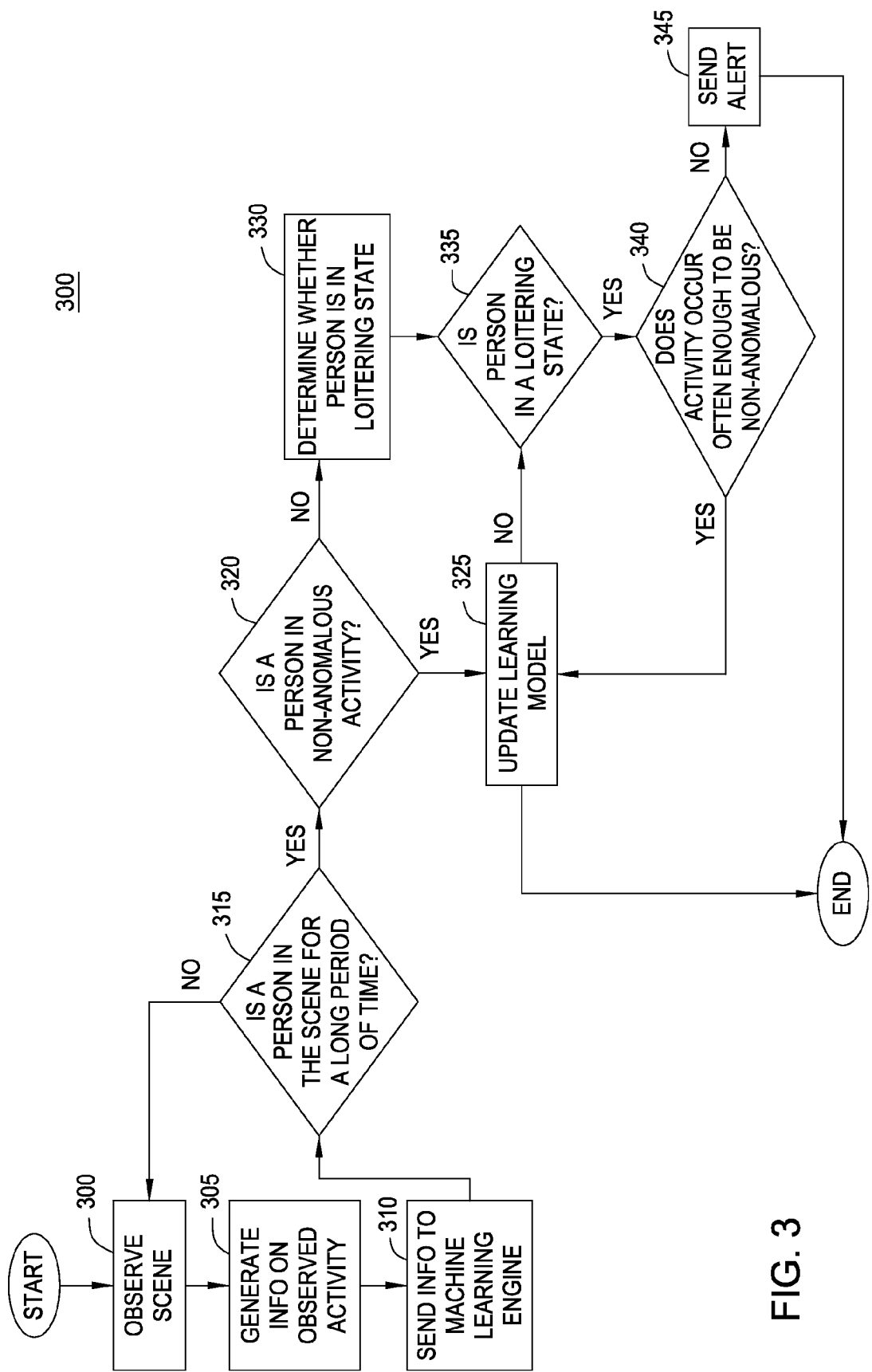
FIG. 3 illustrates a method for detecting loitering behavior of an object in a scene, as captured by a sequence of video frames, according to one embodiment.

FIG. 3 illustrates a method for loitering detection using a behavioral recognition-based surveillance system, according to one embodiment. As shown, the method begins at step 300 with the behavioral recognition system observing a scene. At step 305, the computer vision engine generates information on what is observed. For instance, the computer vision engine may generate information on the kinematic and appearance features of each person. At step 310, it sends that information to the machine learning engine.

At step 315, the machine learning engine determines whether an object is a candidate for being assigned a loitering status. If not, then the method returns to step 300. Otherwise, at step 320, the machine learning engine determines whether the person is engaged in non-anomalous activity, that is, activity learned by the machine learning engine to be a normal occurrence. If so, then the machine learning engine updates the loitering detection module's learning model with information of the occurrence (e.g., how long the person is in the scene). If not, the machine learning engine sends the identifier and data of the observed object (i.e., the person) to the loitering detection module.

At step 330, the machine learning engine runs the loitering detection module. The loitering detection module determines whether the person is in a loitering state based on if the person is engaged in a random walk. In one embodiment, the loitering detection module does this by evaluating whether the individual has traveled a distance of less than the distance traveled in $\sqrt{2N}$ steps from the starting position in the trajectory. In another embodiment, the loitering detection module does this by evaluating the likelihood that the distance traveled by the person is less than the distance in a two-dimensional random walk model based on the person's trajectory. If the loitering detection module does not report loitering behavior, then the machine learning engine updates the learning model with information of the occurrence (step 325). If the loitering detection module does report loitering behavior, then the machine learning engine determines whether the loitering activity should be considered non-anomalous activity (step 340). This occurs when the machine learning engine processes a recurring loitering pattern a sufficient amount of times to disregard it as a loitering anomaly. If it does, then the machine learning engine updates the learning model (step 325). However, if it does not, then the machine learning engine generates an alert (step 345).

Figure 4:
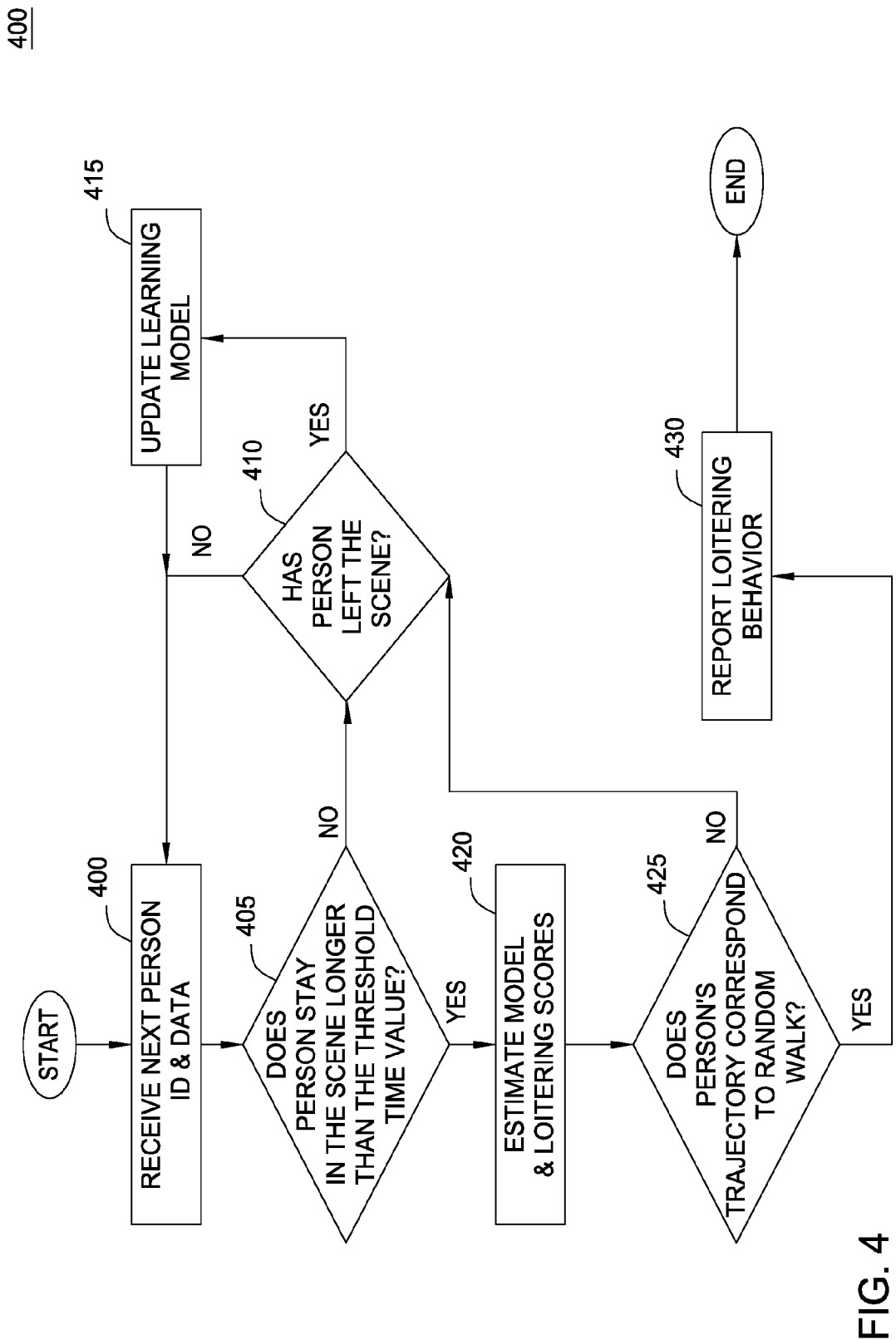
FIG. 4 illustrates a method detecting loitering behavior of an object in a scene, as captured by a sequence of video frames, according to one embodiment.

FIG. 4 illustrates a method for detecting loitering activity, according to one embodiment. As shown, the method begins at step 400, where the module receives an identifier and data of a person (i.e., a type classification of a group of pixels representing a model of a person) in a scene. At step 405, the loitering detection module determines whether the person has been in the scene over a threshold period of time. In one embodiment, the threshold time value may be set as a matter of preference (e.g., three minutes). Alternatively, the threshold time may be set relative to a distribution in the learning model of the loitering detection module of how long observed individuals remain in the scene. If the person has not been observed for a period exceeding the threshold, then, at step 410, the loitering detection module determines whether the person has exited the scene. If so, at step 415, the loitering detection module updates the learning model with information (e.g., such as how long the person was in the scene). Otherwise, the loitering detection module returns to step 400 to continue tracking the person.

However, if the person has remained in the scene past the threshold time period, then at step 420, the loitering detection module compares the trajectory of the person to a discrete random walk model trajectory. In one embodiment, the loitering detection module builds a discrete random walk model for the person based on the person's positions and movement sizes throughout the scene. More specifically, the loitering detection module uses the last actual position of the person as a reference point and computes all the distances from previous positions to the reference point. The loitering detection module evaluates the person's trajectory against the random walk model. The loitering detection module compares these distances with the distances estimated by the random walk model. This comparison determines whether the person is engaged in a random walk (at least based on the model), e.g., the person has not traveled a distance greater than $\sqrt{2N}$ steps.

In another embodiment, the loitering detection module performs step 420 by estimating loitering scores for the person's trajectory and comparing them against a threshold loitering score. A loitering score is the probability that the moving distance of the person to a reference point is shorter than a distance in the discrete random walk model generated based on the person's trajectory. In one embodiment, the threshold loitering score is a preset value. The loitering detection module calculates a loitering score by comparing the person's actual position in each frame to the statistics of the random walk model. This model can be expressed as the full distribution of probabilities over distances in the scene. If the average estimated loitering score is greater than the threshold loitering score, then the person is engaged in a random walk. In one embodiment, the loitering score is calculated for the person's trajectory in both global and local perspectives. The final loitering score of the person's trajectory is computed by averaging the global loitering score and N local loitering scores, where N can be a number up to the total number of steps taken in the trajectory.

At step 425, the loitering detection module determines whether the person's trajectory corresponds to a random walk trajectory. If so, then the module reports loitering behavior to the machine learning engine (step 430). The machine learning engine may then determine whether to publish the alert to the user interface.

Figure 5:
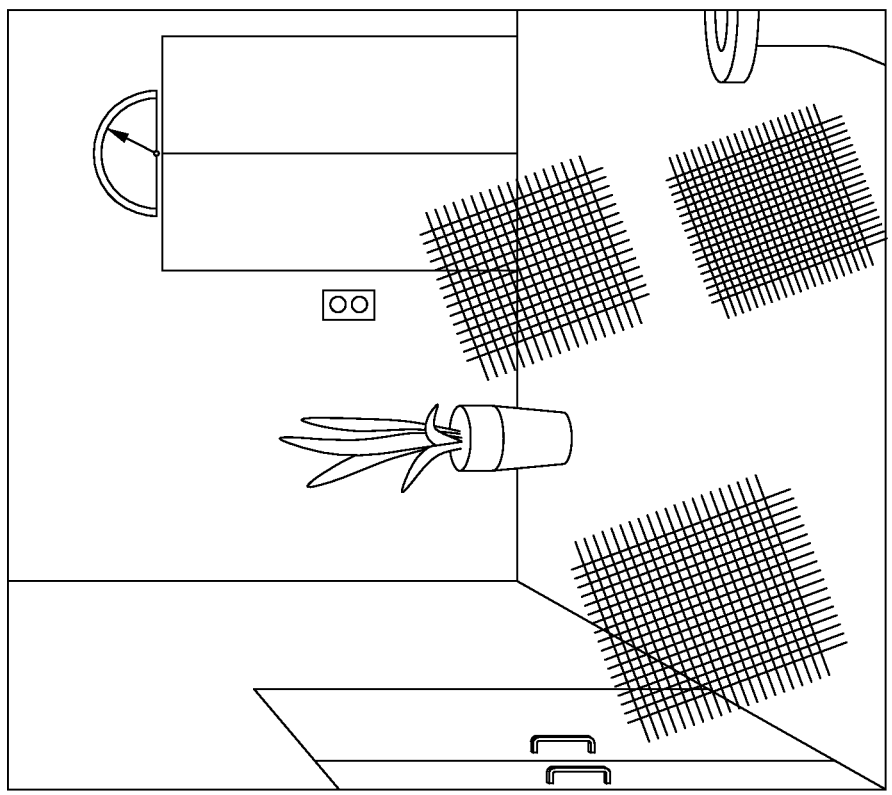
FIG. 5 illustrates an example map of common loitering regions within a scene, according to one embodiment.

FIG. 5 illustrates an example of common loitering regions in a scene, according to one embodiment. As previously disclosed, the machine learning engine may create a map identifying where people commonly loiter with a scene. Doing so aids the loitering detection module to distinguish between normal and anomalous loitering activity. This example of FIG. 5 shows a scene of a hotel lobby captured by a video camera, where common loitering regions are represented by crosshatches. If a person remains in any common loitering region longer than a threshold period of time, the machine learning engine may conclude that the object is engaged in normal activity instead of loitering. However, the machine learning engine may also conclude that the object is engaged in loitering behavior if the object stays uncommonly long. In such a case, the loitering detection module's learning model may determine a threshold time period for loitering behavior in a common loitering region. Further, in one embodiment, tolerances may be set for how closely the object must be within the region for the machine learning engine to recognize normal loitering activity. For example, on one hand, low tolerances may be suitable for a system overlooking a hotel lobby such as the one depicted, but on the other hand, it may be less suitable for a location that requires higher security.

Figure 6:
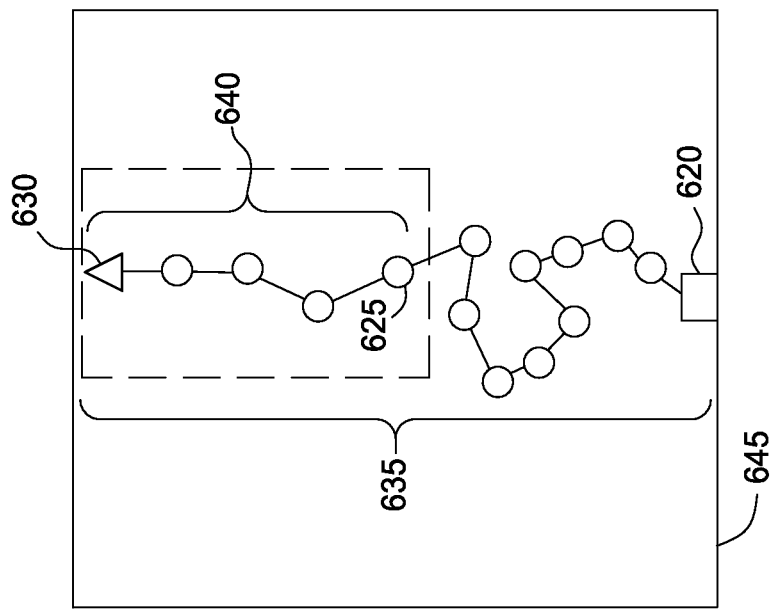
FIG. 6 illustrates two example trajectories made by an individual, according to one embodiment.
Figure 6:
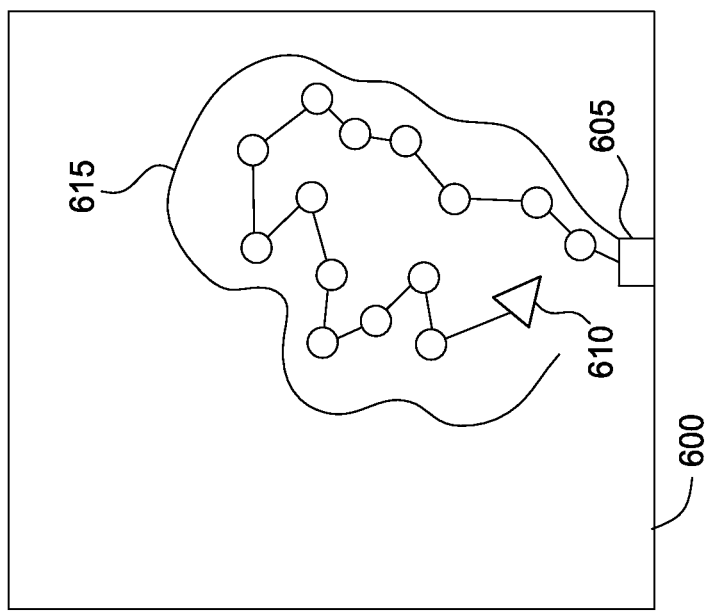

FIG. 6 illustrates two example trajectories made by an individual: an example trajectory 600 and an example trajectory 645, according to one embodiment. Example trajectory 600 is a depiction of a random walk trajectory. As shown, the example trajectory includes a starting position 605, an ending position 610, and a path 615. In this figure, steps in the scene are represented by circles along path 615, where each step in the path takes place over one frame. In the behavioral recognition system, a person's steps in a trajectory are determined relative to distances between pixels in video frames tracked by the centroid position of an object. Likewise, the distance between each step is also determined relative to the distance between pixels in video frames.

In one embodiment, a person who is loitering is less likely to travel a distance of more than $\sqrt{2N}$ steps, where N is the total number of steps taken in the scene. Accordingly, in one embodiment, to determine whether an individual's trajectory corresponds to a random walk, the loitering detection module may calculate the total steps N the individual has taken and enter this value into an formula such as $D=\sqrt{2N}$, where D represents the distance the individual would have traveled if the individual were not engaged in a random walk. If the actual distance that the individual has traveled falls below this value, i.e., $D<\sqrt{2N}$, the loitering detection module may determine that the individual is engaged in a random walk. The loitering detection module uses the ending position 610 as a reference point and computes all distances from previous positions to the reference point. As such, the distance between the starting position 605 and ending position 610 (represented by a dotted line) is depicted as a short distance, despite many steps taken along the path 615. Thus, a loitering detection module may determine that this trajectory highly corresponds to a random walk.

Trajectory 645 is an example trajectory examined in a global perspective and a local perspective. A trajectory has a global starting position 620, a local starting position 625, an ending position 630, a global path 635, and a local path 640. Individual steps are represented by circles, where each step in the path takes place over one frame. The local perspective is represented by the dotted bounding box inside within trajectory 645, and the global perspective is represented by the entirety of trajectory 645. Illustratively, the global perspective includes all steps taken by the individual since entering the scene in global path 635, whereas the local perspective only includes the most recent steps taken, as shown in local path 640. In one embodiment, if the mathematical representation of a random walk trajectory in a global perspective (i.e., the complete trajectory) is $D<\sqrt{2N}$, then the mathematical representation of a random walk trajectory in the local perspective is $D'<\sqrt{2N'}$, where D' is the distance traveled between an local starting position 625 and ending position 630, and N' is the total number of steps taken in local path 640. Although the initial trajectory of the individual highly corresponds to a random walk (with the distance between starting point 620 and ending point 630 being relatively short given the number of total steps taken), the local perspective shows that the individual is making directed steps towards exiting the scene. Thus, the loitering detection module, in evaluating the trajectory, may determine that the individual is not in a loitering state in the local perspective.

In another embodiment, the loitering detection module may determine whether a person is engaged in a random walk by estimating a loitering score for the person's trajectory and comparing the score against a threshold score determined by a random walk model based on the person's trajectory. The loitering score measures the probability that the distance of the person's trajectory is shorter than the model random walk trajectory. To calculate an estimated loitering score, the loitering detection module uses ending position 630 as a reference point calculates a global loitering score from global starting position 620 to ending position 630. Further, the loitering detection module calculates one or more local loitering scores from any position in the trajectory to ending position 630. Thereafter, the loitering detection module averages these values to create an estimated loitering score. If this estimated score is greater than the threshold score, then the loitering detection module may conclude that the person is engaged in a random walk.

The approach of evaluating trajectories in a global perspective and a loitering perspective may further improve the accuracy of anomalies generated by the machine learning engine. In one embodiment, the loitering detection module does not generate a loitering alert unless it determines that the individual is in a loitering state from both a global perspective and a local perspective.

Figure 7:
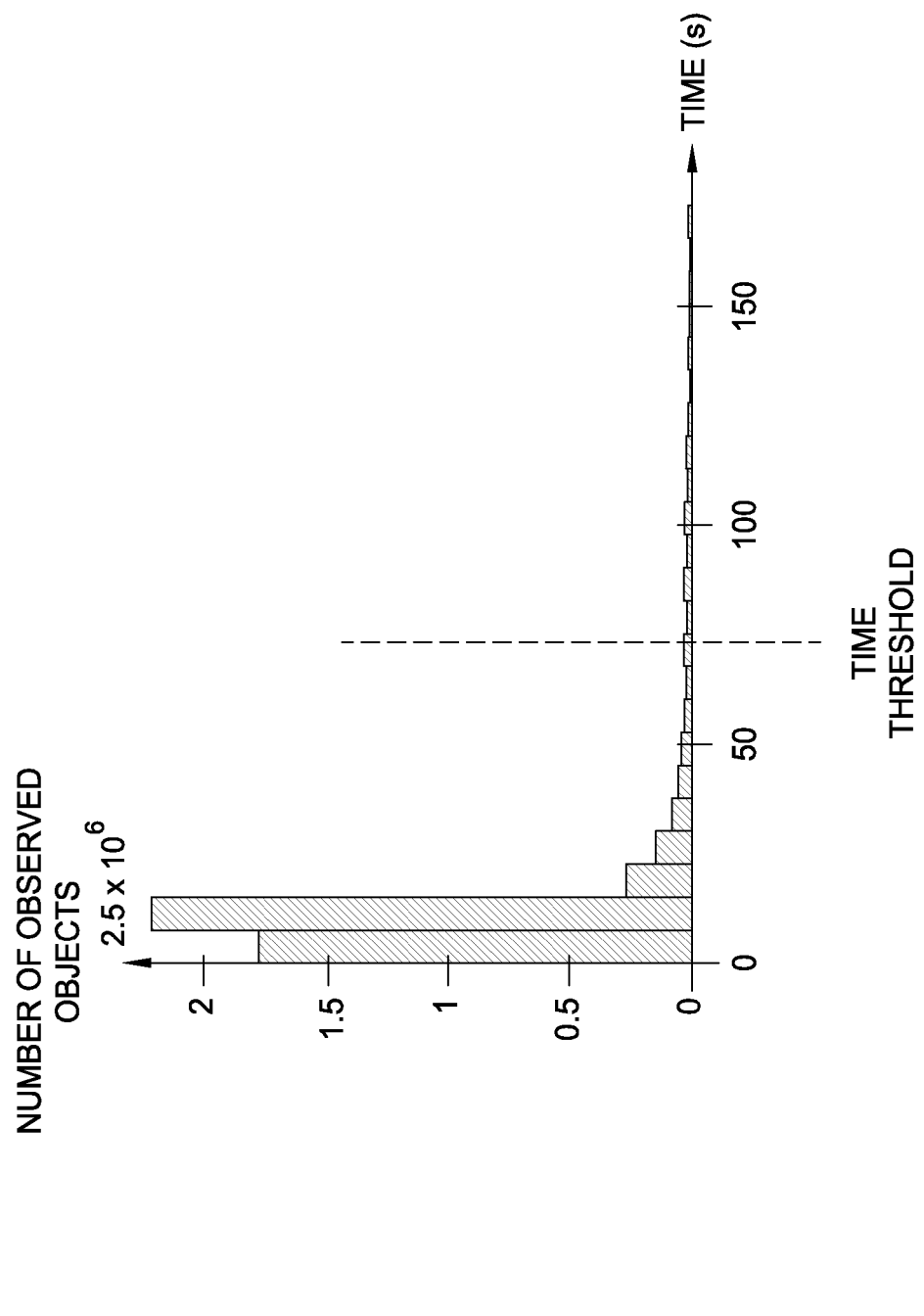
FIG. 7 illustrates a histogram of learning model data that represents a distribution of how long observed objects stay in a camera scene, according to one embodiment.

FIG. 7 illustrates an example empirical histogram in the learning model of a loitering detection module, representing the number of observed individuals in a scene and the amount of time that these individuals remain in the scene, according to one embodiment. As the behavioral recognition system observes more people passing through the scene, the loitering detection module updates the learning model with information of how long each person remains in the scene. As previously disclosed, although the threshold time for when the loitering detection module should evaluate an individual's trajectory may be prescribed as a matter of preference, it may also be readjusted incrementally and adaptively by the learning model, based on a distribution such as the one illustrated. In the histogram shown, a threshold time of seventy-five seconds, represented by a vertical dotted line, is set so that only the top 0.5% of counts are above the threshold.

As described, embodiments herein provide techniques for analyzing and learning behavior based on information streams generated from a video analytics system to detect loitering behavior of an observed object within a series of video frames. Advantageously, this approach does not require a surveillance system relying on predefined patterns to identify behaviors and anomalies but instead learns patterns and behaviors by observing a scene and generating information on what it observes. Accordingly, the embodiments provide techniques for loitering detection by learning patterns of behavior consistent with loitering and generating alerts when it observes such behavior.

While the foregoing is directed to embodiments of the present disclosure, other and further embodiments of the disclosure may be devised without departing from the basic scope thereof, and the scope thereof is determined by the claims that follow.

What is claimed is:

1. A method for detecting loitering behavior of objects depicted in a scene captured by a video camera, the method comprising:
   receiving a trajectory for an object in the scene, wherein the object has been in the scene for a time period, and wherein the trajectory tracks a two-dimensional (2D) path of the object relative to a series of video frames in which the object is depicted; and
   upon determining that the time period that the object has been in the scene is greater than a threshold time period and determining that the trajectory corresponds to a random walk, generating a loitering alert, wherein determining whether the trajectory corresponds to a random walk comprises:
  calculating a global loitering score, wherein the global loitering score is based on a distance between a final point in the trajectory and a starting point in the trajectory,
  calculating at least one local loitering score, wherein each local loitering score is based on a distance between the final point and a respective intermediate point in the trajectory,
  calculating an estimated loitering score as an average of the global loitering score and the at least one local loitering score, and
  comparing the estimated loitering score with a threshold loitering score, wherein the trajectory corresponds to a random walk if the estimated loitering score is greater than the threshold loitering score.

2. The method of claim 1, wherein the object trajectory corresponds to a random walk if $D<\sqrt{2N}$, where D is a distance from a starting point in the trajectory to a final point in the trajectory and N is a total number of steps in the trajectory.

3. The method of claim 2, wherein distance D and steps are determined relative to distances between a set of pixels corresponding to the object in the series of video frames, and wherein the steps are determined by a centroid position of the object in each video frame.

4. The method of claim 1, wherein the trajectory corresponds to a random walk if $D<\sqrt{2N}$, and $D'<\sqrt{2N'}$, where D is a distance from a starting point in the trajectory to a final point in the trajectory, N is a total number of steps in the trajectory, D' is a distance from an intermediate point in the trajectory to the final point in the trajectory, and N' is the total number of steps of the trajectory from the intermediate point to the final point.

5. The method of claim 4, wherein distances D and D' and steps are determined relative to distances between a set of pixels corresponding to the object in the series of video frames, and wherein the steps are determined by a centroid position of the object in each video frame.

6. The method of claim 1, wherein the threshold time period is a preset value.

7. The method of claim 1, wherein the threshold time period is based on a distribution of lengths of time that a plurality of objects have been in the scene.

8. The method of claim 1, wherein the distance between a final point in the trajectory and a starting point in the trajectory and the distance between the final point and each respective intermediate point is determined relative to a set of pixels corresponding to the object in the series of video frames.

9. A non-transitory computer-readable storage medium storing instructions, which, when executed on a processor, performs an operation for detecting loitering behavior, the operation comprising:
  receiving a trajectory for an object in the scene, wherein the object has been in the scene for a time period, and wherein the trajectory tracks a two-dimensional (2D) path of the object relative to a series of video frames in which the object is depicted; and
  upon determining that the time period that the object has been in the scene is greater than a threshold time period and determining that the trajectory corresponds to a random walk, generating a loitering alert, wherein determining whether the trajectory corresponds to a random walk comprises:
    calculating a global loitering score, wherein the global loitering score is based on a distance between a final point in the trajectory and a starting point in the trajectory,
    calculating at least one local loitering score, wherein each local loitering score is based on a distance between the final point and a respective intermediate point in the trajectory,
    calculating an estimated loitering score as an average of the global loitering score and the at least one local loitering score, and
    comparing the estimated loitering score with a threshold loitering score, wherein the trajectory corresponds to a random walk if the estimated loitering score is greater than the threshold loitering score.

10. The computer-readable storage medium of claim 9, wherein the object trajectory corresponds to a random walk if $D<\sqrt{2N}$, where D is a distance from a starting point in the trajectory to a final point in the trajectory and N is a total number of steps in the trajectory.

11. The computer-readable storage medium of claim 10, wherein distance D and steps are determined relative to distances between a set of pixels corresponding to the object in the series of video frames, and wherein the steps are determined by a centroid position of the object in each video frame.

12. The computer-readable storage medium of claim 9, wherein the trajectory corresponds to a random walk if $D<\sqrt{2N}$, and $D'<\sqrt{2N'}$, where D is a distance from a starting point in the trajectory to a final point in the trajectory, N is a total number of steps in the trajectory, D' is a distance from an intermediate point in the trajectory to the final point in the trajectory, and N' is the total number of steps of the trajectory from the intermediate point to the final point.

13. The computer-readable storage medium of claim 12, wherein distances D and D' and steps are determined relative to distances between a set of pixels corresponding to the object in the series of video frames, and wherein the steps are determined by a centroid position of the object in each video frame.

14. The computer-readable storage medium of claim 9, wherein the threshold time period is a preset value.

15. The computer-readable storage medium of claim 9, wherein the threshold time period is based on a distribution of lengths of time that a plurality of objects have been in the scene.

16. The computer-readable storage medium of claim 9, wherein the distance between a final point in the trajectory and a starting point in the trajectory and the distance between the final point and each respective intermediate point is determined relative to a set of pixels corresponding to the object in a series of video frames.

17. A system comprising:
a processor; and
a memory hosting an application, which, when executed on the processor, performs an operation for detecting loitering behavior, the operation comprising:
  receiving a trajectory for an object in the scene, wherein the object has been in the scene for a time period, and wherein the trajectory tracks a two-dimensional (2D) path of the object relative to a series of video frames in which the object is depicted, and
  upon determining that the time period that the object has been in the scene is greater than a threshold time period and determining that the trajectory corresponds to a random walk, generating a loitering alert, wherein determining whether the trajectory corresponds to a random walk comprises:

calculating a global loitering score, wherein the global loitering score is based on a distance between a final point in the trajectory and a starting point in the trajectory;

calculating at least one local loitering score, wherein each local loitering score is based on a distance between the final point and a respective intermediate point in the trajectory;

calculating an estimated loitering score as an average of the global loitering score and the at least one local loitering score; and comparing the estimated loitering score with a threshold loitering score, wherein the trajectory corresponds to a random walk if the estimated loitering score is greater than the threshold loitering score.

18. The system of claim 17, wherein the object trajectory corresponds to a random walk if $D < \sqrt{2N}$, where D is a distance from a starting point in the trajectory to a final point in the trajectory and N is a total number of steps in the trajectory.

19. The system of claim 18, wherein distance D and steps are determined relative to distances between a set of pixels corresponding to the object in the series of video frames, and wherein the steps are determined by a centroid position of the object in each video frame.

20. The system of claim 17, wherein the trajectory corresponds to a random walk if $D < \sqrt{2N}$, and $D40 < \sqrt{2N'}$, where D is a distance from a starting point in the trajectory to a final point in the trajectory, N is a total number of steps in the trajectory, D' is a distance from an intermediate point in the trajectory to the final point in the trajectory, and N' is the total number of steps of the trajectory from the intermediate point to the final point.

21. The system of claim 20, wherein distances D and D' and steps are determined relative to distances between a set of pixels corresponding to the object in the series of video frames, and wherein the steps are determined by a centroid position of the object in each video frame.

22. The system of claim 17, wherein the threshold time period is a preset value.

23. The system of claim 17, wherein the threshold time period is based on a distribution of lengths of time that a plurality of objects have been in the scene.

24. The system of claim 17 wherein the distance between a final point in the trajectory and a starting point in the trajectory and the distance between the final point and each respective intermediate point is determined relative to a set of pixels corresponding to the object in a series of video frames.

* * * * *